United States Patent [19]
Yang

[11] Patent Number: 5,550,660
[45] Date of Patent: Aug. 27, 1996

[54] STN DISPLAYS HAVING HIGH CONTRAST, WITH PURPLE POLARIZER AND RESIDUAL BIREFRINGENCE CAUSING GREENISH-GOLD OR PURPLISH-BLUE COLORING

[75] Inventor: Kei-Wean C. Yang, Beaverton, Oreg.

[73] Assignee: Tektronix, Inc., Wilsonville, Oreg.

[21] Appl. No.: 156,593

[22] Filed: Nov. 22, 1993

[51] Int. Cl.⁶ .................................................. G02F 1/1335
[52] U.S. Cl. ............................. 359/63; 359/70; 359/64
[58] Field of Search .................................. 359/63, 102, 70, 359/73

[56] References Cited

U.S. PATENT DOCUMENTS

| | | | |
|---|---|---|---|
| 4,859,037 | 8/1989 | Iwashita et al. | 359/64 |
| 5,089,906 | 2/1992 | Ohnishi et al. | 359/73 |
| 5,119,216 | 6/1992 | Wada et al. | 359/102 |
| 5,126,868 | 6/1992 | Kizaki et al. | 359/63 |
| 5,139,340 | 8/1992 | Okumura | 359/63 |
| 5,361,163 | 11/1994 | Matsuda et al. | 359/452 |

*Primary Examiner*—Anita Pellman Gross
*Assistant Examiner*—Toan Ton
*Attorney, Agent, or Firm*—Paul A. Angello; John D. Winkelman; Michael O. Scheinberg

[57] ABSTRACT

A display system (10) or display (12) has a supertwisted nematic liquid crystal cell (30) located between first and second polarizing filters (24, 54) that have respective first (26) and second (56) transmission axes that form respective polar angles (A, D) with a reference plane (28). The first polarizing filter passes a neutral polarized color along the first transmission axis and has another transmission axis (27) orthogonal to the first transmission axis and transmissive of a purple polarized color; the second polarizing filter is of a neutral density type. The cell has first and second electrode structures (32, 34) confining a liquid crystal composition, each having an inner surface with respective liquid crystal alignment directions (38, 40) of inner-surface-contacting directors of the liquid crystal composition forming respective polar angles (B, C) with the reference plane. The second polarizing filter may be associated with a translucent film (64) to reflect light toward the second polarizing filter. Preferred polar angles include: A=110°; B=150°; C=30°; and D=−10°. With those angles, the display has excellent contrast, viewability, and color hue contrast between display elements (52) in the nonselected state (which appear greenish-gold) and display elements in the selected state (which appear dark purplish-blue); display elements in the relaxed state appear gold at room temperature.

28 Claims, 2 Drawing Sheets

STN DISPLAYS HAVING HIGH CONTRAST, WITH PURPLE POLARIZER AND RESIDUAL BIREFRINGENCE CAUSING GREENISH-GOLD OR PURPLISH-BLUE COLORING

TECHNICAL FIELD

The present invention pertains to display devices and display systems using supertwisted nematic ("STN") liquid crystal displays ("LCDs").

BACKGROUND OF THE INVENTION

A passive matrix liquid crystal display ("LCD") is one popular type of display whose display elements respond to the values of the rms voltages applied across them. A passive matrix LCD includes overlapping row electrodes and column electrodes positioned on opposite sides of a film of liquid crystal material. The locations where the row and column electrodes overlap define the display elements. The portion of liquid crystal film associated with each display element is an electro-optic material that responds to a change in the value of an rms voltage applied across the display element to provide a corresponding change in the amount of light passing through it. The liquid crystal device most prevalently used in such displays is of an STN type.

The row electrodes receive addressing signals that select the rows at various times, and the column electrodes receive data signals that represent the information patterns to be displayed. A polarizer and analyzer, located on opposite sides of the STN cell, affect the intensity of light that propagates through the display element as the orientation of molecules in the liquid crystal material changes in response to electric fields applied to the liquid crystal material by way of the overlapping row and column electrodes that define that display element. A display system includes electrical circuits that provide a difference in electrical potential between overlapping row and column electrodes and thereby apply electric fields to the liquid crystal material.

Conventional low cost flat panel displays that display a high information content in matrixed form use STN LCDs almost exclusively. Such a display can be designed by following established guidelines, such as those summarized in T. Scheffer & J. Nehring, "Supertwisted Nematic (STN) LCDs" ("Scheffer & Nehring"), submitted to the 1993 SID International Symposium at Seattle, Washington. However, when following such guidelines, it is often difficult to design high contrast displays that are sufficiently bright and also have adequate contrast. In conventional low cost flat panel STN LCD displays the best compromise between contrast, panel uniformity, and cost of manufacturing has been achieved by using liquid crystal cells having a supertwist angle or layer twist angle of between 220° and 240°. Typically, both the polarizer and the analyzer are of a neutral density type.

However, because of the residual birefringence of the liquid crystal cell, in such a display the display elements appear colored. Film compensation or double cell compensation to achieve black and white displays is typically not practical where the objective is to achieve a low cost display.

Such a display typically falls into one of three categories of display coloration: a blue image on a yellow-green background, a dark purple-blue image on a pinkish background, and a dark blue image on a light gray-green background. Many people strongly dislike displays with blue on a yellow-green background. Displays showing dark purple-blue on a pinkish background are also not well-received.

The remaining conventional choice, dark blue on a light gray-green background, offers a color combination more appealing to most people. However, the intensity of the gray-green background of such LCDs is rather dark. As a result, reflective-type displays using that color combination are marginally adequate, and transflective-type displays using that color combination are just a bit too dark for effective use in dim or otherwise poor ambient light. (A transflective display may be viewed by a user in either light provided by a backlighting or illumination source contained in the display (the transmissive mode of use) or in ambient light (the reflective mode of use).) Attempts to enhance the viewing angle and to further diffuse the reflected light into a larger viewing cone make the darkness problem of the gray-green background even worse. Users of transflective displays implemented to provide that color combination tend to make frequent use of the backlighting source provided with such displays. This can create a severe battery life problem for portable devices equipped with such displays. In addition, displays showing dark blue on light gray-green tend to lose contrast at higher temperatures such as about 55° C. (131° F.); displays can reach such temperatures when in use.

SUMMARY OF THE INVENTION

An object of the invention is, therefore, to provide an LCD and display system having improved viewability in dim or otherwise poor ambient light.

Another object of the invention is to provide an LCD and display system having improved visibility of the off state or background.

Another object of the invention is to provide an LCD and display system having a more aesthetically pleasing color combination.

Another object of the invention is to provide an LCD and display system having improved contrast at higher temperatures.

Another object of the invention is to achieve the foregoing objects in an economical way by using standard, commercially available components.

A display according to the invention has first and second polarizing filters having respective first and second transmission axes angularly displaced by about 110° to about 130°, and preferably by about 120°, relative to each other. The first transmission axis is transmissive of a purple color. An STN liquid crystal cell is located between the filters and has first and second electrode structures confining a liquid crystal composition, each having an inner surface with an alignment layer conditioned so that the alignment directions of surface-contacting directors of the liquid crystal composition at the inner surfaces are angularly displaced by between about 110° and about 130°, and preferably by about 120°, relative to each other. One of the alignment directions is angularly displaced by about 35° to about 45°, and preferably by about 40°, relative to the second transmission axis.

A display system according to the invention also includes an electrical driving circuit that places chosen display elements at relaxed, nonselected, and selected electrical potentials effective to place liquid crystal material between those chosen electrodes in relaxed, nonselected, and selected states. When such a display system is viewed in white light by a human eye from the front of the cell, display cells formed by such overlapping electrodes may be gold in the relaxed state, greenish-gold in the nonselected state, and dark purplish blue in the selected state when the light is incident on the display from within a cone forming an angle of about 45° with respect to the viewing axis of the display.

A display system according to the invention has a background or nonselected state with an enhanced intensity that is much more easily viewable in dim or otherwise poor ambient light, and has better performance at higher temperatures, than displays having a dark blue display on a light gray-green background. As a result, the need for backlighting in a transflective display is greatly reduced. A display according to the invention also has an excellent combination of color hues that, together with the enhanced intensity of the background, gives the display a better display contrast, and makes the display easier to read, than displays with conventional color choices. A display according to the invention also provides a color combination that is more aesthetically pleasing than that of conventional displays such as a blue display on a yellow-green background. Such a display may also use a textured transreflector to assist a user's eye in focusing.

These and other objects, features, and advantages of the invention will become apparent upon consideration of the following detailed disclosure of the invention, especially when it is taken in conjunction with the accompanying drawings, in which:

DETAILED DESCRIPTION OF PREFERRED EMBODIMENTS

Figure 1:
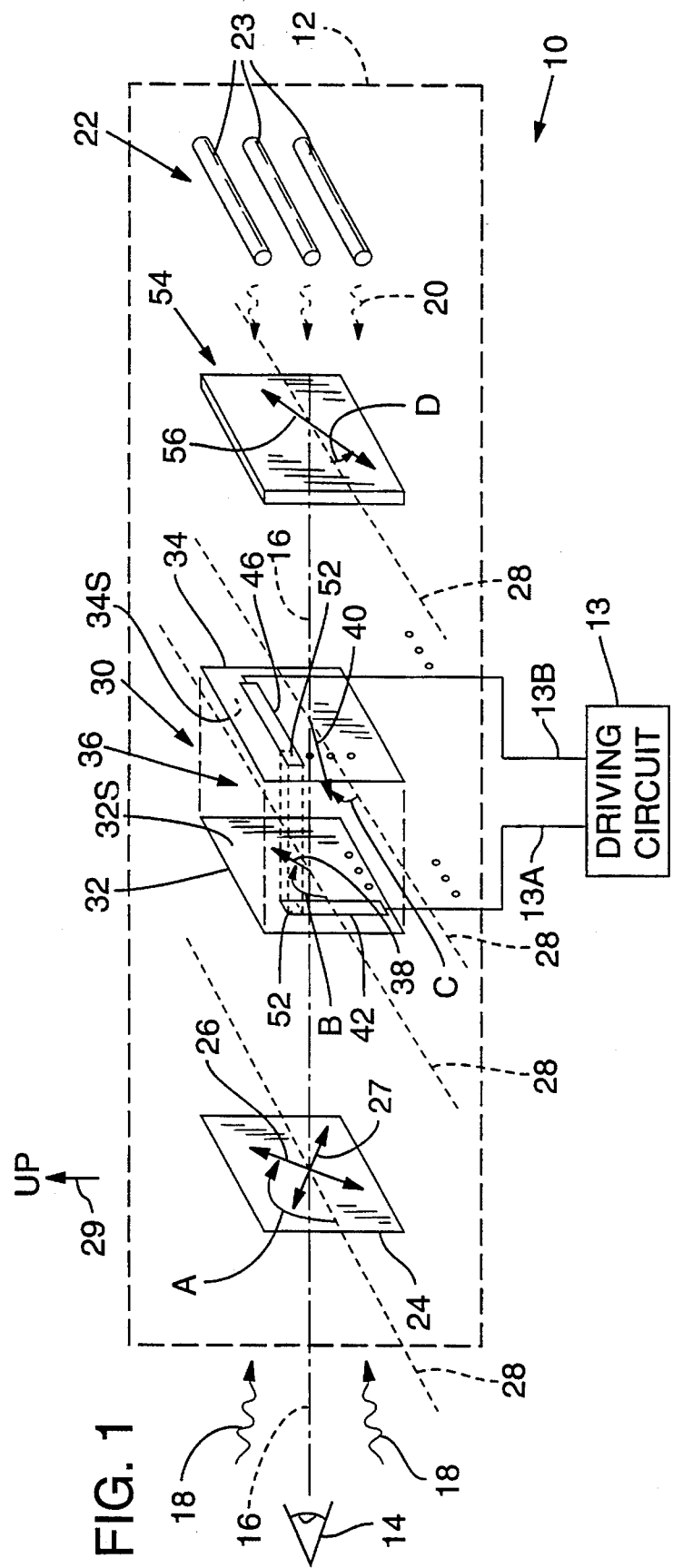
FIG. 1 is an exploded partly isometric and partly schematic view of a display system including a display, each according to the invention.

FIG. 1 is an exploded partly isometric and partly schematic view of a display system 10 that includes a display 12, each according to the invention. Display system 10 also includes an electrical driving circuit 13, which is operable to supply electrical signals to components within display 12 as described below, and connections 13A and 13B from driving circuit 13 to components within display 12.

Display 12 is viewed by a human eye 14 looking along or substantially along a viewing axis 16. Display 12 is illuminated with either or both of ambient light 18, supplied from a source (not shown) outside display 12, such as the sun or electric lighting, and internally produced light 20 produced by a light source or backlight 22 inside display 12. Light source 22 includes one or more fluorescent or other (such as powdered electroluminescent) lamps 23 driven from a source (not shown) of electric power.

Arranged along viewing axis 16 are a first polarizing filter or color-selective linear polarizer 24 that passes a linearly polarized neutral color along a first transmission axis 26 and passes purple light (i.e., passes a combination of a red and a blue color but blocks a green color) polarized along its other axis 27 orthogonal to axis 26. Polarizer 24 is preferably the polarizer sold by Polatechno of Tokyo, Japan, as part number V2-18245T.

In normal operation display 12 is oriented with respect to a reference plane 28, which is preferably horizontal, and upward direction 29. When viewed from the front of display 12 and along or substantially along viewing axis 16, first transmission axis 26 forms a polar angle A relative to reference plane 28. Polar angles are measured looking into display 12 from its front as shown in FIG. 1 and are positive in a counterclockwise rotational sense.

Also located on viewing axis 16 is a STN liquid crystal cell 30 defined in part by first and second or front and back spaced-apart electrode structures 32 and 34 confining a liquid crystal composition 36. Front electrode structure 32 has an inner surface 32S with an alignment layer (not shown) conditioned so that the alignment directions of surface-contacting directors of the liquid crystal composition point in direction 38, which forms a polar angle B relative to reference plane 28. Rear electrode structure 34 has an inner surface 34S with an alignment layer (not shown) conditioned so that the alignment directions of surface-contacting directors of the liquid crystal composition point in direction 40, which forms a polar angle C relative to reference plane 28. Cell 30 is the STN liquid crystal cell contained in a THM 550 sold by Tektronix, Inc., of Beaverton, Oreg., as part no. 119-5043-00; the polarizers contained in that product are removed to obtain the cell preferably used as cell 30. That liquid crystal cell has a cell gap d of about 6.8 micrometers, has rubbed polyimide alignment layers affording a pretilt angle of about 5.75° to surface-contacting liquid crystal directors that contact those alignment layers, and has a layer twist angle or twist angle of about 240°.

First electrode structure 32 also has plural first electrodes 42 (only one shown) preferably extending perpendicular to reference plane 28 (preferably in the vertical direction) and each electrically coupled through connections 13A (only one shown) with driving circuit 13. Second electrode structure 34 also has plural second electrodes 46 (only one shown) preferably extending parallel to reference plane 28 (preferably in the horizontal direction) and each electrically coupled through connections 13B (only one shown) with driving circuit 13.

Overlapping portions of first electrodes 42 and second electrodes 46 define display elements 52 (only one shown). Driving circuit 13 is operable to place chosen overlapping first and second electrodes 42 and 46 at electrical potentials sufficient to cause the liquid crystal composition 36 contained in display element 52 to assume selectively a relaxed state, a nonselected state, and a selected state. The relaxed state occurs when the electrical potential of the chosen first electrode 42 and second electrode 46 is the same. A nonselected state occurs when the electrical potential $V_{NS}$ of the chosen first electrode 42 and second electrode 46 is sufficient to cause the directors of the liquid crystal composition to align in a twisted manner from inner surface 32S of front electrode structure 32 to inner surface 34S of back electrode structure 34 while remaining generally parallel to those surfaces. A selected state occurs when the electrical potential $V_s$ between chosen first electrode 42 and chosen second electrode 46 is sufficient to cause the directors of the liquid crystal composition to align generally perpendicular to inner surfaces 32S and 34S.

Also aligned on viewing axis 16 is a transreflector 54 containing a second polarizing filter 55 (FIG. 2) having a second transmission axis 56. Filter 55 is preferably of a neutral density type. Second transmission axis 56 forms a polar angle D relative to reference plane 28. Transreflector 54 may be a linear polarizing transreflector sold by Nitto Denko of Osaka, Japan, as part no. F-4205P1.

Figure 2:
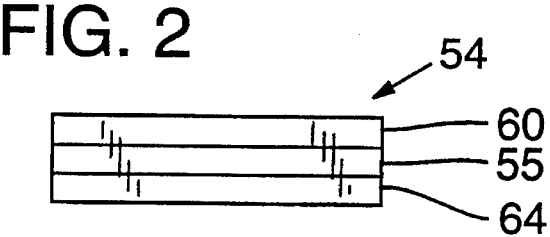
FIG. 2 is a diagrammatic side view of a transreflector structure shown in FIG. 1.

FIG. 2 is a diagrammatic side view of transreflector 54, which has a protective film or layer 60 joined to a film or layer forming polarizing filter 55, which in turn is joined to a film or layer 64 of a translucent material. Protective layer 60 minimizes permeation of moisture to polarizing filter 55 and has substantially no anisotropy. Polarizing filter 55 defines second transmission axis 56 (FIG. 1) of transreflector 54. Layer 64 diffuses light 18 and/or optional light 20 to provide more even illumination of display 12. Transreflector 54 is installed in display 12 with layer 64 facing internal light source 22 and layer 60 facing second electrode structure 34.

In one preferred embodiment, polarizing filter 55 is chosen to be of a large grain type with a lower transmissivity than used in previous transflective displays such as that sold by Optrex of Japan as part no. DMF682AN-EW or the Hypertwist™ Flat Panel Display sold by Tektronix, Inc., as part no. HTD-2561. A choice of a lower transmissivity polarizing filter 55 would appear to be counterintuitive because lower transmissivity cuts down the backlighting efficiency by allowing less light 20 from light source or backlight 22 to pass through display 12 to human eye 14. However, that light loss is largely compensated by shifting the transmission spectrum away from the typical bluish-green color to a longer wavelength greenish-gold color, to which human eye 14 is more sensitive. As a result of using a lower transmissivity polarizing filter 55, more ambient light 18 is directed back toward human eye 14 at the front of display 12, and there is little loss of electroluminescent intensity as perceived by human eye 14.

The large grains in transreflector 54 create a slightly textured background, similar to a bond paper, to display 12 as seen by human eye 14. This provides an elegant touch or a better "presence" to the displayed image. It appears that the slightly textured background helps human eye 14 focus on display 12 with less effort than required by previous designs.

Figure 3:
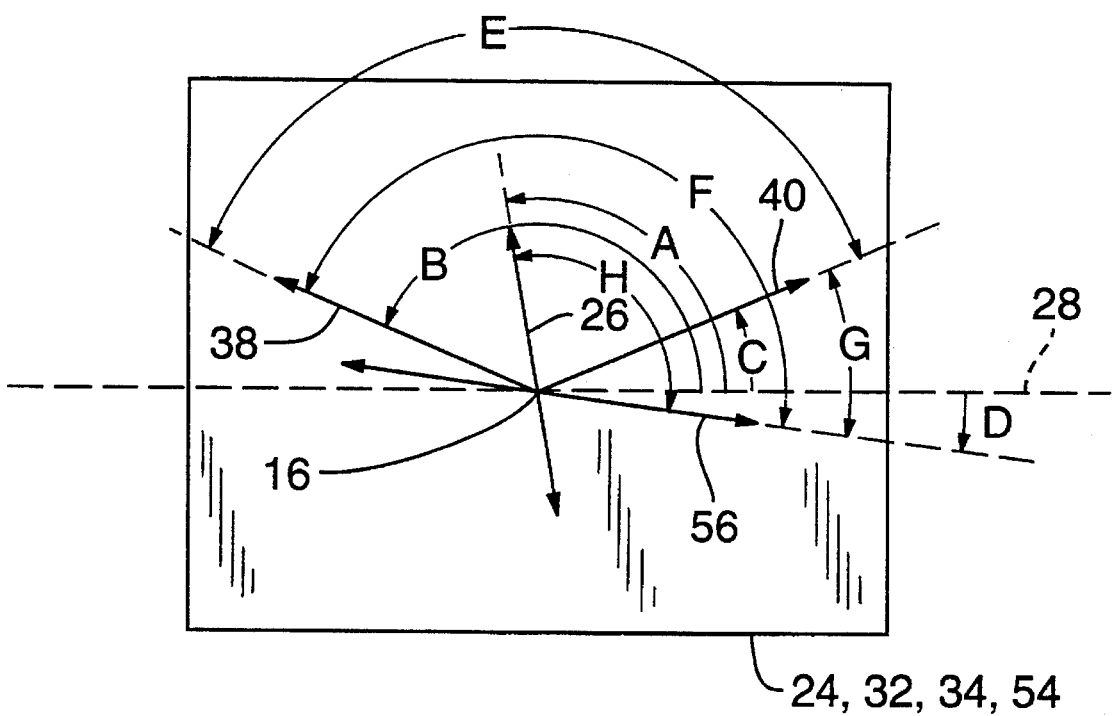
FIG. 3 is a schematic view of the front of the display system showing the angular orientation of the transmission axes of two polarizing filters, and of the alignment directions of two plates of a liquid crystal cell, shown in FIG. 1.

FIG. 3 is a schematic view from the front of display 12, as seen by human eye 14 of FIG. 1 along viewing axis 16, showing more clearly the transmission axes 26 and 56 of respective first and second polarizing filters 24 and 54 and alignment directions 38 and 40. FIG. 3 shows more clearly polar angles A, B, C, and D. Alignment directions 38 and 40 are angularly displaced from each other by an angle E and by respective angles F and G from second transmission axis 56. Transmission axes 26 and 56 are angularly displaced from each other by an angle H.

The advantageous results of the invention are achieved by properly selecting angular displacements between selected pairs of first transmission axis 26, first alignment direction 38, second alignment direction 40, and second transmission axis 56 or by selecting the polar angles of those directions and axes. In one preferred embodiment, the polar angles relative to reference plane 28 are as follows:

TABLE 1

| Polar Angle | Value of About |
|---|---|
| A | 110° |
| B | 150° |
| C | 30° |
| D | −10° |

The discovery and selection of the foregoing preferred polar angles occurred by departing from the conventional approach to developing new display devices. Because of the need for commercial displays to have a high contrast ratio specification in order to be competitive, the conventional approach is to develop a LCD that places primary importance on achieving a high contrast ratio, which is measured with standard instrumentation and according to standard procedures as set out in Scheffer and Nehring. Because of ease of implementing and repeatability, measurement techniques for characterizing LCD contrast were developed for use with transmissive displays rather than for use with mainly transflective displays. Nonetheless, similar techniques are conventionally used to design transflective displays. However, standard contrast ratio instrumentation and procedures do not correspond to the way a human eye views a display in practical environments in which user applications occur. Therefore, the appearance of a display to the human eye in typical ambient light was used in selecting the most preferred angles, and contrast ratio readings were not considered the chief guide.

Display 12 with the foregoing preferred polar angles would have display elements 52 with a greenish-yellow color in a nonselected state if first polarizing filter 24 were of a neutral density type. To correct that poor greenish-yellow nonselected state color, first polarizing filter 24 is chosen to be a purple linear polarizer of the type described above. The purple tint along the light stop direction (i.e., along other axis 27) effectively compensates the bluish-green birefringence color component and results in a pleasing greenish-gold color tone for display elements in the nonselected state. For the selected state there is a minor residual birefringence from the cell 30. Therefore, the darkness of the chosen display element 52 is largely determined by the effect of the crossed first polarizer 24 and second polarizer 55 (FIG. 2). In conventional designs, the relative angle between the first and second polarizers is thus often chosen to be 90°. In the preferred embodiment, transmission axes 26 and 56 of respective filters 24 and 55 have an angular displacement H relative to each other (FIG. 3) of about 120° rather than of 90°. This makes the selected state slightly darker. However, the increase in the relaxed state brightness and the new color tone vastly outweigh that slight drawback.

The term "greenish-yellow color" is a qualitative description; such a color can be produced with many different combinations and angular orientations of front and back polarizers 24 and 54. However, the foregoing preferred polar angles give the best performance. The best polar angle settings for viewing by human eye 14 do not necessarily correspond to the polar angle settings that produce the highest contrast ratio measurements using standard contrast ratio instrumentation and procedures.

Good results may also be obtained with other relations among first transmission axis 26, first alignment direction 38, second alignment direction 40, and second transmission axis 56. Such other relations are conveniently described with reference to the angular displacement between different pairs of those directions.

The invention includes display systems 10 and displays 12 in which the layer twist angle of cell 30 is between about 230° and about 250°, angular displacement E between first and second alignment directions 38 and 40 is between about 110° and about 130°, and alignment direction 38 or 40 is angularly displaced by respective angular displacement F or G of between about 35° to about 45° relative to second transmission axis 56 for best "six o'clock" viewing direction when reference plane 28 is horizontal and upward direction 29 is considered "twelve o'clock."

The invention also includes displays 10 in which, in addition to the conditions set forth in the preceding paragraph, the following conditions are also present:

the layer twist angle of cell 36 is between about 235° and about 245°, and alignment directions 38 and 40 are angularly displaced by between about 115° and about 125° relative to each other; or the layer twist angle of cell 36 is about 240°, and alignment directions 38 and 40 are angularly displaced by an angle E of about 120° relative to each other; or one of alignment directions 38 and 40, and second transmission axis 56, are angularly displaced by respective angles F or G of about 40° relative to each other; or first and second transmission axes 26 and 56 are angularly displaced by an angle H of about 120° relative to each other; or one of alignment directions 38 and 40, and second transmission axis 56, are angularly displaced by respective angles F and G of about 40° relative to each other, and first and second transmission axes 26 and 56 are angularly displaced by an angle H of about 120° relative to each other; or one of alignment directions 38 or 40 is angularly displaced by a respective angle F or G of about 40°, and first transmission axis 26 is angularly displaced by an angle H of about 120°, each relative to second transmission axis 56.

When display system 10 has a high multiplexing ratio, as in high-information-content displays such as VGA displays, it is preferable that the layer twist angle of cell 30 be as high as practicable, e.g., 240°.

Display system 10 or display 12 according to the invention shows an excellent color hue difference between display cells that are in the nonselected state and display elements that are in the selected state when display 12 is illuminated by white light and viewed by human eye 14 substantially along the viewing axis.

As is known to skilled persons, STN displays can be operated with selected and nonselected voltages within limited respective ranges. Using the possibilities afforded by those ranges, driving circuit 13 can adjust the colors of display elements in the nonselected and selected states by adjusting the respective values of $V_{NS}$ and $V_s$. Display system 10 and display 12 my incorporate an adjustment mechanism by which a user can adjust the value of $V_{NS}$, $V_S$, or both $V_{NS}$ and $V_s$, and thereby adjust the precise color combination shown by display elements in nonselected and selected conditions.

When display system 10 or display 12 is illuminated by white light (such as that provided by a white fluorescent lamp, which uses a cool white phosphor) and viewed by human eye 14 substantially along viewing axis 16, when the parts described above are used, and when the most preferred angles of Table 1 are used, display cells that are in the selected state are a dark purplish-blue color, and display cells that are in the nonselected state are a greenish-gold color.

The relaxed state of liquid crystal composition 36 does not depend on an adjustable drive voltage. A display system 10 or display 12 of the type just described, when viewed from the front of the display by human eye 14 in white light of the type just described coming from the front from within a cone making an angle of about 45° relative to viewing axis 16, appears gold in the relaxed state at room temperature (about 25° C. (about 77° F.)) when the preferred orientations of Table 1 are used. Such a display system, when viewed from the front by human eye 14 and illuminated by optional light 20 provided by white electroluminescent lamps 23, appears a light tan color when in the relaxed and nonselected states and a purple color in the selected state.

A display system 10 and display 12 having the preferred parameters set out above maintain an enhanced contrast at low temperatures (e.g., 2° C. (36° F.)); they also show less display darkening at elevated temperatures (e.g., 55° C. (131° F.)) than typical blue on gray-green displays with identical liquid crystal cell structures.

It will be apparent to skilled persons that many changes may be made to the details of the above-described embodiments of this invention without departing from the underlying principles thereof. In particular, the invention may be used in display systems and displays that are operable in only a transmissive or a reflective mode and/or are oriented for optimum viewing performance at other than the six o'clock viewing direction, i.e., are oriented with reference plane 28 other than horizontal or rotated 180° from the position shown in FIGS. 1 and 3. The scope of the present invention should, therefore, be determined only by the following claims.

I claim:

1. A display device, comprising:

first and second polarizing filters having respective first and second transmission axes angularly displaced by about 110° to about 130° relative to each other, the first transmission axis transmissive of a neutral polarized color, the first polarizing filter also having another transmission axis orthogonal to the first transmission axis and transmissive of a purple polarized color; and a supertwisted nematic (STN) liquid crystal cell positioned between the first and second polarizing filters, characterized by a layer twist angle of between about 230° and about 250°, and including two spaced-apart electrode structures confining a liquid crystal composition, each electrode structure having an inner surface with an alignment layer conditioned so that the alignment directions of surface-contacting directors of the liquid crystal composition at the inner surfaces are angularly displaced by between about 110° and about 130° relative to each other, one of the alignment directions angularly displaced by between about 35° to about 45° relative to the second transmission axis, the STN liquid crystal cell producing in combination with the first and second polarizing filters a display in which the residual birefringence causes display cells that are in the nonselected state to appear greenish-gold and display cells that are in the selected state to appear dark purplish-blue when the display system is illuminated by white light and viewed by a human eye substantially along the viewing axis.

2. The display device of claim 1, wherein the layer twist angle is between about 235° and about 245°, and the alignment directions are angularly displaced by between about 115° and about 125° relative to each other.

3. The display device of claim 1, wherein the layer twist angle is about 240°, and the alignment directions are angularly displaced by about 120° relative to each other.

4. The display device of claim 1, wherein one of the alignment directions and the second transmission axis are angularly displaced by about 40° relative to each other.

5. The display device of claim 1, wherein the first and second transmission axes are angularly displaced by about 120° relative to each other.

6. The display device of claim 1, wherein one of the alignment directions and the second transmission axis are angularly displaced by about 40° relative to each other, and the first and second transmission axes are angularly displaced by about 120° relative to each other.

7. The display device of claim 1, wherein one of the alignment directions forms a polar angle of about 40°, and the first transmission axis forms a polar angle of about 120°, each relative to the second transmission axis.

8. The display device of claim 7, wherein the STN cell has a layer twist angle of about 240°.

9. The display of claim 1, further comprising a reflector positioned along the viewing axis to reflect light propagating from the second polarizing filter back toward the second polarizing filter.

10. The display system of claim 9, wherein the reflector comprises a transreflector.

11. A display system having a viewing axis, comprising:
 first and second polarizing filters positioned on the viewing axis and having respective first and second transmission axes angularly displaced by about 110° to about 130° relative to each other, the first transmission axis transmissive of a neutral polarized color, the first polarizing filter also having another transmission axis orthogonal to the first transmission axis and transmissive of a purple polarized color;
 a supertwisted nematic (STN) liquid crystal cell positioned on the viewing axis between the first and second polarizing filters, characterized by a layer twist angle of between about 230° and about 250°, and including two spaced-apart electrode structures confining a liquid crystal composition, each electrode structure having an inner surface with an alignment layer conditioned so that the alignment directions of surface-contacting directors of the liquid crystal composition at the inner surfaces are angularly displaced by between about 110° and about 130° relative to each other, one of the alignment directions angularly displaced by between about 35° to about 45° relative to the second transmission axis, the electrode structures having respective first and second electrodes, overlapping portions of the first and second electrodes defining display cells, the STN liquid crystal cell producing in combination with the first and second polarizing filters a display in which the residual birefringence causes display cells that are in the nonselected state to appear greenish-gold and display cells that are in the selected state to appear dark purplish-blue when the display system is illuminated by white light and viewed by a human eye substantially along the viewing axis; and
 an electrical driving circuit of a character that places chosen overlapping respective first and second electrodes at relaxed, nonselected, and selected electrical potentials effective to place liquid crystal material in a display cell between the chosen overlapping electrodes in respective relaxed, nonselected, and selected states.

12. The display system of claim 11, wherein the layer twist angle is between about 235° and about 245° and the alignment directions are angularly displaced by between about 115° and about 125° relative to each other.

13. The display system of claim 11, wherein the layer twist angle is about 240°, and the alignment directions are angularly displaced by about 120° relative to each other.

14. The display system of claim 11, wherein one of the alignment directions and the second transmission axis are angularly displaced by about 40° relative to each other.

15. The display system of claim 11, wherein the first and second transmission axes are angularly displaced by about 120° relative to each other.

16. The display system of claim 11, wherein one of the alignment directions and the second transmission axis are angularly displaced by about 40° relative to each other, and the first and second transmission axes are angularly displaced by about 120° relative to each other.

17. The display system of claim 11, wherein one of the alignment directions forms a polar angle of about 40°, and the first transmission axis forms a polar angle of about 120°, each relative to the second transmission axis.

18. The display system of claim 17, wherein the STN cell has a layer twist angle of about 240°.

19. The display system of claim 17, wherein the second transmission axis forms a polar angle of about −10° with the horizontal when the display system is in normal use.

20. The display system of claim 11, further comprising a reflector positioned along the viewing axis to reflect light propagating from the second polarizing filter back toward the second polarizing filter.

21. The display system of claim 20, wherein the reflector is of the transreflector type and includes a diffuser that produces a background having a textured appearance to a human eye looking into the display system substantially along the viewing axis.

22. The display system of claim 20, wherein the reflector comprises a transreflector.

23. The display system of claim 11, further comprising a translucent medium positioned along the viewing axis to supply diffuse light propagating in a direction toward the second polarizing filter, the second polarizing filter positioned between the STN cell and the translucent plate.

24. The display system of claim 23, wherein the translucent medium is of the type having grains defined in part by grain boundaries, the grains having a sufficiently large size to make the grain boundaries visible as a textured background to a human eye looking into the display system substantially along the viewing axis.

25. The display system of claim 23, further comprising a source of white light positioned to supply white light that propagates through the translucent medium toward the second polarizing filter.

26. The display system of claim 11, wherein the second polarizing filter is of a neutral density type.

27. The display system of claim 11, wherein the STN cell contains a nematic liquid crystal composition characterized in part by surface-contacting directors, and the alignment layers of the electrode structures are each of a character that imparts to the surface-contacting directors a pretilt angle of about 5.75° relative to the alignment layers.

28. The display system of claim 11, wherein display cells that are in the relaxed state are a gold color when the display system is illuminated by white light and viewed by a human eye substantially along the viewing axis.

* * * * *